Dec. 20, 1966 A. GABOR 3,293,613

INFORMATION RECORDING SYSTEM

Filed April 5, 1963 2 Sheets-Sheet 1

INVENTOR.
ANDREW GABOR

BY Douglas M. Clarkson
ATTORNEY

INVENTOR.
ANDREW GABOR
BY Douglas M. Clarkson
ATTORNEY

United States Patent Office 3,293,613 Patented Dec. 20, 1966

3,293,613

INFORMATION RECORDING SYSTEM

Andrew Gabor, Port Washington, N.Y., assignor to Potter Instrument Company, Inc., Plainview, N.Y., a corporation of New York Filed Apr. 5, 1963, Ser. No. 270,884
9 Claims. (Cl. 340—172.5)

This invention, generally, relates to data processing and, more particularly, to an improved system for storing and retrieving data under conditions which permit the information transfer rate to be varied between widely separated limits.

Data in binary form is stored conveniently on magnetic tape in the form of magnetized spots. With such systems, it is desirable to write (store) and read (retrieve) information using a predetermined tape speed and bit packing density to ensure the desired write/read reliability. However, in many situations it is necessary to process data in a system at widely different information transfer rates at the input and the output.

Variations in tape speed to obtain different information transfer rates has proven unsatisfactory. At high tape speeds the tape drive becomes excessively complex causing programming limitations and a very high tape wear rate. At low tape speeds, electrical complications are encountered such as low read signal amplitude and poor signal-to-noise ratios.

Therefore, it is a primary object of this invention to provide a system for storing and retrieving information at different, widely separated information transfer rates utilizing a predetermined, fixed tape speed to obtain a desired write/read reliability.

In accordance with this object, there is provided, in a preferred embodiment of this invention, a tape handler apparatus having a tape drive mechanism to move magnetic tape past an information transfer station at a predetermined, fixed speed. Upon receipt of information at the input to the system, it is loaded first in one of a pair of information storage buffers at the rate at which it is received. When this first buffer is filled, the information input is switched to the second storage buffer, and while the second buffer is being filled, the first storage buffer of the pair is unloading its information onto a magnetic tape at a rate higher than that at which it was loaded into the buffer.

The first buffer, therefore, will be unloaded and empty before the second buffer is loaded and full, because of the different transfer rates. As soon as the second buffer is full, the input information is transferred back to the first, now empty, buffer. Simultaneously, the second buffer now is unloaded at a high rate and is written on the tape.

For the system of the invention, two modes of operation are possible depending upon the input data transfer rate. When the input transfer rate is at its highest limit, the magnetic tape will run continuously, and the contents of a storage buffer, when unloaded and written on the tape, will occupy a certain space by virtue of the unloading time and the tape velocity. Since the unloading of one buffer is more rapid than the loading of the other buffer, some time will elapse before the other buffer is full and ready to be unloaded.

During this waiting interval, nothing is written on the continually moving tape. Hence, the tape format will consist of blocks of data separated by gaps of tape containing no information. These blocks of data are referred to as "quantum blocks," and the spaces between them as "interquantum gaps." Thus, the continuous tape motion mode determines the tape format.

The other mode of operation occurs when the input data transfer rate is made much lower than its highest possible limit. Here the tape moves in a start-stop mode. Because the input data rate is so low, it takes a considerable time for each storage buffer to be loaded fully.

As in the continuous tape motion mode, the input data will be transferred from the first buffer to the second buffer as soon as the first buffer is full. Unlike the continuous tape motion mode, however, as soon as the first buffer is full, tape motion must be initiated, and continued until the buffer is unloaded, at which time the tape is stopped to produce the same tape format as that which was generated during the continuous tape motion mode.

It is a particularly desirable feature that the tape format is the same regardless of the input data rate.

To read the tape now, the steps outlined above are traced through in the reverse sequence. Thus, to retrieve data at the high data rate, the tape will run continuously, and a suitable playback signal from the tape is used to load the two buffers alternately.

The unloading of the buffers is alternate also, and the rate will be governed by an internal oscillator. To retrieve the data at the low data rate, the tape will run in a start-stop manner, and each start-stop cycle will load one buffer while successive cycles will load the buffers alternately.

The unloading of the buffers is alternate also, and this rate will be governed by an internal oscillator having a frequency which corresponds to the desired data output frequency. It should be noted at this point that data may be retrieved from the system at a rate different from that at which it was stored.

Having described this invention briefly, it will be described now in greater detail along with other objects and advantages in the following more detailed specification which may best be understood by reference to the accompanying drawings, in which.

Figure 1:
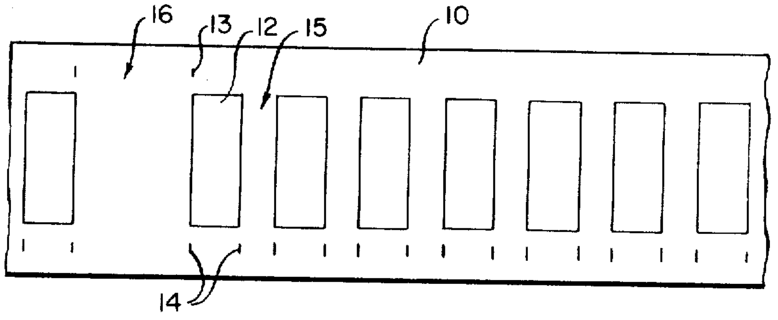
FIG. 1 is a plan view of a tape having data stored thereon.
Figure 2:
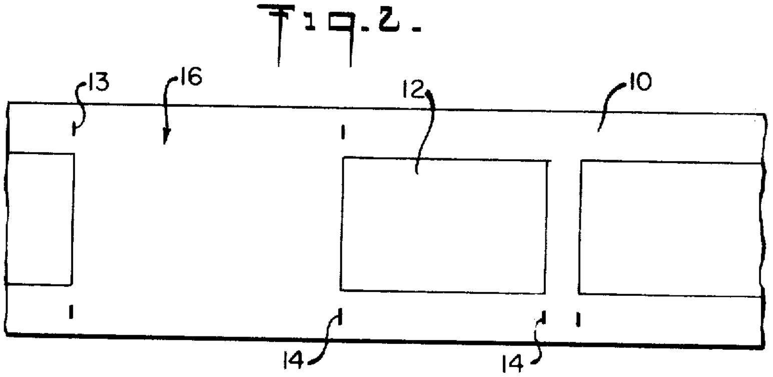
FIG. 2 is an enlarged view of the tape shown in FIG. 1.

Referring now to FIGS. 1 and 2, there is shown a magnetic tape 10 on which characters of information are recorded in each quantum block identified by the numeral 12, and each quantum block 12 is located in position by quantum markers 14 to permit identification. Successive quantum blocks 12 are separated by an interquantum gap 15.

It may reasonably be assumed that the input information will not require the use of an entire reel of tape at once, thus, provision is made for separating groups of quantum blocks 12 by using an interblock gap 16, which is such wider than the interquantum gap 15 and, also, by delineating the beginning and end of each group of quantum blocks 12 by block markers 13.

Figure 3:
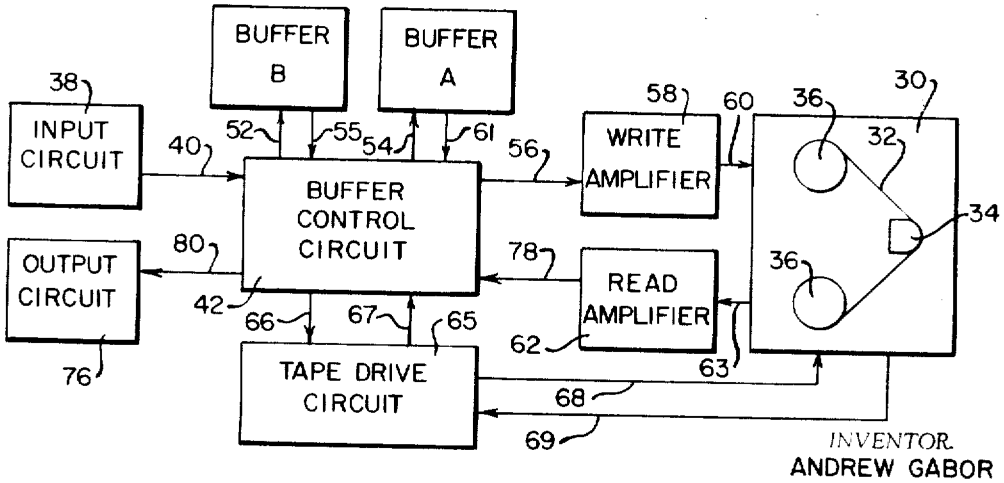
FIG. 3 is a block diagram of the information recording system in accordance with the present invention.

The recording system may best be understood by reference to FIG. 3 of the drawings which shows a tape handler apparatus 30 for moving magnetic tape 32 past an information transfer station 34, which station includes the usual write-read magnetic transducer head. The tape 32 is moved between storage reels 36 by a customary tape pinch-roller, drive capstan mechanism (not shown).

Information is fed into the storage system through an input circuit 38 and over a connection 40 to a storage buffer control circuit 42. This buffer control circuit 42 controls the loading and unloading of the two information storage buffers A and B which are employed alternately during information storage and retrieval operations.

The loading of the buffers A and B is accomplished over leads 54 and 52, respectively, and the unloading is accomplished over leads 61 and 55, respectively. While any suitable information storage device may be used as the buffers, the preferred form of the invention employs two magnetic core memories. The remaining portions of the system will be described in greater detail in the explanation of an operation cycle.

*High transfer rate input operation*

During operation of the system at a high information transfer rate, a continuous tape motion is required. Assume that this tape motion has been obtained.

Data will enter the system through the input circuit 38, go over the connection 40 to the buffer control circuit 42. From here it will be routed to the buffer A over the lead 54. When this buffer A is full, the buffer control circuit 42 instantaneously switches the information input to the buffer B over the lead 52.

Simultaneously, with the switching from buffer A to buffer B, the control circuit 42 unloads the buffer A over a lead 61 and records the information on the tape 32, over a lead 56, through a write amplifier 58, over a lead 60, and through the transducer head 34. The buffer A is unloaded at a faster rate than buffer B is being loaded, and therefore, the buffer A is unloaded and ready to receive information before the buffer B is fully loaded.

When the buffer B is filled, the buffer control circuit 42 will shift the input information instantaneously back to buffer A, while simultaneously initiating the unloading of the buffer B over the lead 55 and recording the information on the tape 32 through the path mentioned above.

It is seen that, by unloading the buffers at a higher rate than they are loaded, the buffer control circuit 42 produces information stored on the tape in quantum blocks depending, in size, upon the buffer size. In addition, the buffer control circuit 42 ensures that one buffer is always available for loading, thereby permitting continuous information input during writing.

*Low transfer rate input operation*

During operation of the system at a low information transfer rate, a start-stop tape motion is required. Tape motion will be initiated when a storage buffer is loaded fully and is ready to unload its contents for writing.

Assume data input has started. Data will enter the system through the input circuit 38 and over the connection 40 to the buffer control circuit 42. From here, it will be routed to buffer A over the lead 54. When the buffer A is full, the buffer control circuit 42 instantaneously switches the incoming information to buffer B over the lead 52.

As this point in the operation, it is necessary to initiate the unloading procedure for the now full buffer A. To preserve the tape format, it is necessary to position the tape so that when the unloading begins, the tape will be the proper distance past the previous group of quantum blocks, and the tape will be up to speed. While any appropriate procedure may be utilized to achieve this tape positioning, the preferred embodiment employs the following:

At the same time the input data is switched from the loaded buffer A to the enpty buffer B, the control circuit 42 issues a "tape-run-backward" command over a lead 66 connected to a tape drive circuit 65. The drive circuit 65 then provides a "tape drive" signal which is connected over a lead 68 to the tape handler apparatus 30 where the signal will cause the tape 32 to move backward.

The tape will continue to move backwards until the end-of-quantum marker of the previously written group of quantum blocks passes over the transducer head 34 and is read. A signal developed by the end-of-quantum marker will go over a lead 63, through a read amplifier 62, over a lead 78 to the buffer control circuit 42. At this time, the buffer control circuit 42 will issue a "tape-run-forward" command to the drive circuit 65 over the lead 66, and this will cause the tape to reverse direction to move now in a forward direction.

Because of unavoidable mechanical inertia, the tape will continue to move backward a small distance after the end-of-quantum marker is sensed and after the "tape-run-forward" command is issued. Consequently, some time after the "tape-run-forward" command is given, the end-of quantum marker will be intercepted again, only in this instance the tape is running forward.

The signal developed by the end-of-quantum marker goes over the lead 63 again, through the read amplifier 62, and over the lead 78 to the buffer control circuit 42. At this time, an internal timing device, preferably a monostable multivibrator, is triggered.

At the end of an accurately fixed interval as determined by the internal timing device, the unloading of the buffer A is initiated. The duration of the output pulse of the monostable multivibrator is adjusted so that the tape has moved to the position which, when the pulse ends, will cause the interquantum gap so produced to be the same length as that produced automatically during the continuous tape motion mode occurring when the data arrives at the high input transfer rate.

The unloading of buffer A occurs over the lead 61, through the buffer control circuit 42, over the lead 56, through the write amplifier 58, over the lead 60 and to the transducer head 34. The information transfer rate, during the unloading of a buffer while writing, is constant regardless of which input data rate is being used. This writing rate is controlled by a fixed-frequency writing oscillator internal to the buffer control circuit 42.

*Information retrieval operation*

Information is retrieved by reversing the sequence of steps used in recording. The tape motion required will be start-stop for a low output data rate and continuous for the high data rate.

The play back signal containing the recorded information is developed from the tape 32 by the transducer head 34, and is transferred to the buffer control circuit 42 over the lead 63, through the read amplifier 62 and over the lead 78. The buffer control circuit 42 alternately loads the information into the buffer A and into the buffer B over the leads 54 and 52, respectively, and the buffers are unloaded over the leads 61 and 55, respectively.

The rate of unloading is controlled by an oscillator within the control circuit 42, as will be described in greater detail presently. The frequencies of the signals that may be produced by this oscillator corresponds to the desired data output rates.

The highest possible data output rate, however, is determined by the frequency of the playback signal from the tape. As the buffers are unloaded, the information is routed from the buffer control circuit 42 over a lead 80 to an output circuit 76.

The various tape motion conditions, which were referred to previously above, depend upon the rate at which it is desired to have the information pass through the input and the output circuits 38 and 76. While any suitable circuitry may be used for generating continuous tape motion and start-stop tape motion (with tape positioning operation), such circuitry preferably is the conventional binary logic circuitry and timing devices. The exact nature of the logic and timings to be used depend upon the electromechanical characteristics of the tape handler apparatus, such as the starting time and distance, the stopping time and distance, the tape velocity stabilization time and distance, etc.

In addition, cognizance must be taken of whether a single-gap or a dual-gap transducer head is used, and if a dual-gap head is used, the distance between the read and write gaps must be considered. Since such circuitry is conventional and is quite well known in the art, no further elaboration is believed to be necessary.

Figure 4:
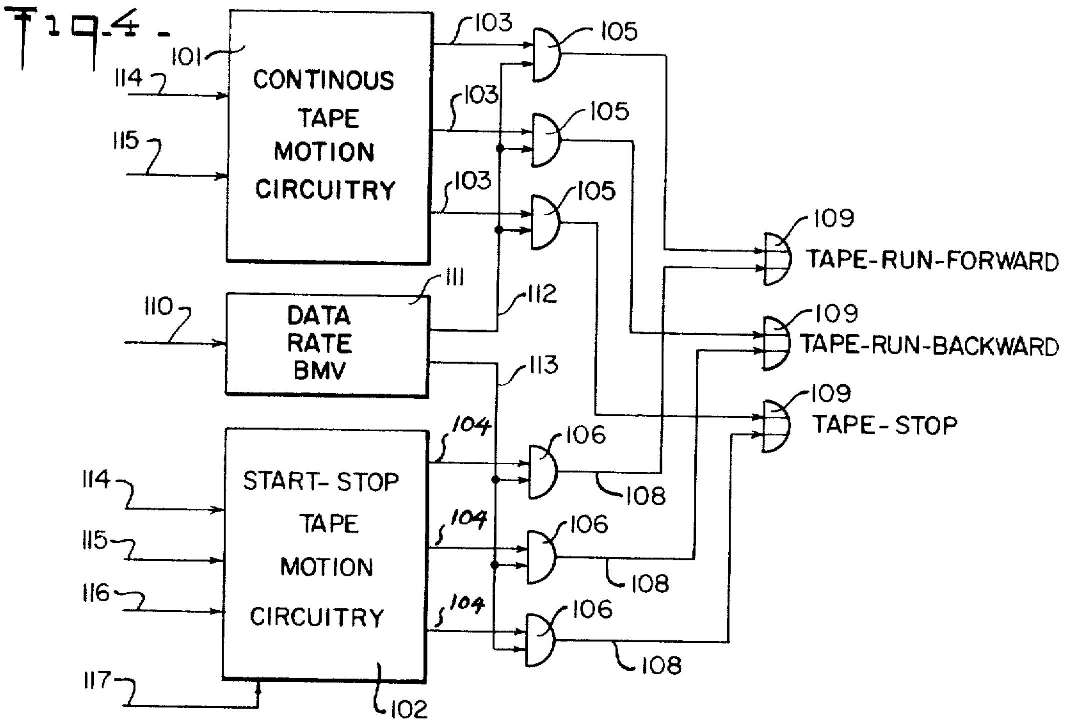
FIG. 4 is a diagram of tape motion selection circuit.
Figure 5:
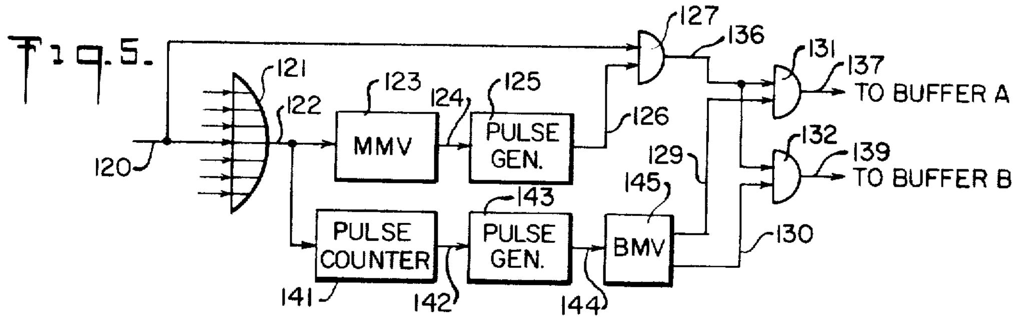
FIG. 5 is a diagram of the buffer loading control circuit.
Figure 6:
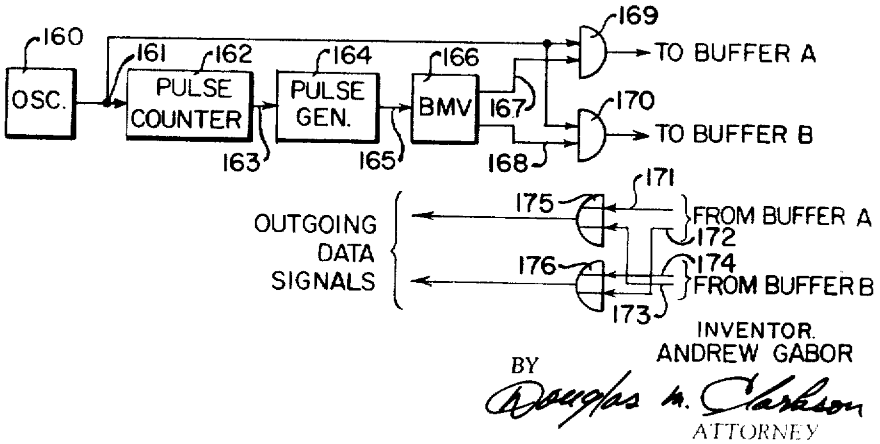
FIG. 6 is a diagram of the buffer unloading control circuit.

FIGS. 4, 5 and 6 provide a more detailed explanation of the functions and circuitry present in the buffer control circuit 42.

*Tape motion selection operation*

FIG. 4 illustrates a tape motion selection operation for the example where only two different information transfer rates are used. The signals coming to the buffer control circuit 42 from the tape handler apparatus 30 over the lead 63, through the read amplifier 62, over the lead 78, include a "beginning-of-block" marker input connection 114, an "end-of-block" marker input connection 115, a "beginning-of-quantum" marker input connection 116, and an "end-of-quantum" marker input connection 117.

These signals go to their appropriate circuits. For example, since the continuous tape motion mode of operation does not require the beginning and end-of-quantum markers, these signals do not go to that circuit, indicated by the numeral 101. However, since both the continuous tape motion mode of operation circuit 101 and the start-stop mode of operation circuit 102 involve a generation of the correct interblock gap, the beginning-of-block marker input connection 114 and the end-of-block marker input connection 115 are shown going to both circuits 101 and 102, respectively.

Each of the circuits 101 and 102 have "tape-run-forward," "tape-run-backward," and "tape-stop" output connections 103 and 104 for continuous motion and start-stop motion control signals, respectively. These output connections 103 and 104 go into AND gates 105 and 106, respectively.

A "data-rate" selection signal input connection 110, which signal must be supplied by the user, serves to set or to reset a data rate bistable multivibrator 111. The complementary output connections 112 and 113 serve as inputs to AND gates 105 and 106, respectively. Since the output connections 112 and 113 are complementary, when one of them is a binary 1 level, the other will be a binary 0 level.

By this arrangement, one set of AND gates (105 or 106) will be "enabled" and the other set "inhibited" by the output from the data rate bistable multivibrator 111. The output signals from the AND gates 105 and 106 go over leads 107 and 108, respectively, to OR gates 109. It can be seen that the state of the data rate bistable multivibrator 111 serves to select the outputs of the appropriate motion-controlling circuits 101 and 102.

*Buffer loading control*

FIG. 5 depicts the buffer loading circuit. Information to be loaded into the buffers A and B appears on one of a plurality of input lines 120. From the lines 120, an input signal is connected to an AND gate 127.

In addition, the input signal is connected to an OR gate 121 from which, over a lead 122, it is connected to a monostable multivibrator 123, which is triggered by this incoming signal. An output pulse from the monostable multivabrator 123 is conducted over a lead 124 to a pulse generator 125 which produces a signal over a lead 126 to condition the AND gate 127.

The output signal from the OR gate 121 goes over the lead 122 to a pulse counter circuit 141, which circuit is advanced one step for each signal input. The capacity of the counter circuit 141 is the same as that of each of the storage buffers. In the following example, the buffer capacity is taken as 128 characters, and so for this case, the pulse counter circuit 141 would count 128 characters and then emit an output signal.

An output signal from the counter circuit 141 goes over a lead 142 to trigger a pulse generator circuit 143. The pulse generator circuit 143, when triggered, generates a pulse which goes over a lead 144 to a bistable multivibrator circuit 145, which is triggered symmetrically. By "symmetrical triggering" is meant that each time the bistable multivibrator circuit 145 receives a pulse from the pulse generator circuit 143, the circuit 145 is triggered and changes state.

The two complementary outputs of the bistable multivibrator circuit 145 go to respective ones of AND gates 131 and 132 associated with each of the storage buffers. Thus, one output of the circuit 145 goes to the AND gate 131 of the storage buffer A over a lead 129, and the complementary output goes to the AND gate 132 of the storage buffer B over a lead 130.

Since the output signals of the bistable multivibrator 145 are complementary, one of the AND gates 131 or 132 will be enabled and the other inhibited. Thus, incoming signals for each of the lines 120 can be directed selectively into either the storage buffer A or the storage buffer B.

*Buffer unloading control*

FIG. 6 illustrates the buffer unloading circuit. In order to unload a storage buffer, it is necessary to drive the buffer with some sequence of pulses. The buffer unloading then will take place in synchronism with the pulse sequence.

In this example, an oscillator circuit 160 is used to generate a pulse sequence with three different frequencies: one for writing; one for reading at high data rates; and one for reading at low data rates. While three separate oscillator circuits may be used, a single oscillator circuit 160 is shown for simplicity.

The oscillator 160 delivers pulses over a lead 161 to both a pulse counter circuit 162 and AND gates 169 and 170. The pulse counter circuit 162 has the same capacity as the storage buffers A and B. When the pulse counter circuit 162 counts the proper number of pulses, an output signal is delivered over a lead 163 to trigger a pulse generator circuit 164.

The pulse generator circuit 164 provides a signal over a lead 165 to a bistable multivibrator circuit 166, which is triggered symmetrically. That is, each time a signal arrives over the lead 165, the bistable multivibrator 166 changes state to the opposite of its previous state.

The complementary output signals from the bistable multivibrator circuit 166 go over leads 167 and 168 to AND gates 169 and 170, respectively. Since these output signals are complementary, one of the AND gates 169 or 170 will be enabled and the other inhibited. Consequently, the pulses from the oscillator 160 will be routed alternately to the buffer A and the buffer B.

The buffers A and B, as a result of receiving these pulses, will unload. From the buffer A, for example, two of the channels of data will arrive over leads 171 and 172. From the buffer B, the corresponding two channels will arrive over leads 173 and 174.

Similar channels from the two buffers are combined in a single OR gate. Thus, the OR gate 175 receives signals on the leads 171 and 173, and the OR gate 176 receives signals on the leads 172 and 174. The output signals from these OR gates go to the write amplifier 58 during writing and to the output connector 76 during reading.

*Specific example*

To provide a more detailed explanation, assume the following parameters:

- tape speed is 60 inches per second;
- data packing density is 1000 characters per inch;
- buffer storage capacity is 128 characters;

- high data transfer rate into the system is 45,000 characters per second;
- low data transfer rate into the system is 300 characters per second; and
- the information transfer rate to and from the magnetic tape on the tape handler apparatus is 60,000 characters per second.

To transfer 128 characters to or from a storage buffer at this rate, it will (128 divided by 60,000) seconds or 2.13 milliseconds.

Consider first the case of high information input rate, and the magnetic tape is running continuously. Here, the storage buffer will be loaded in (128 divided by 45,000) seconds, or 2.85 milliseconds, by the incoming information. Assume that the buffer A is in the process of being loaded at the time the operation first comes under consideration.

As soon as the buffer A is full, the buffer control circuit 42 will switch the incoming information to start loading the buffer B. Simultaneously, the buffer control circuit 42 will cause the buffer A to unload its contents for writing on the magnetic tape.

Since the buffer B will be loaded in 2.85 milliseconds, the unloading of buffer A will be finished 0.72 millisecond before the buffer B is filled.

Nothing will be written on the tape during this 0.72 millisecond interval. At the end of this time, the buffer B will be fully loaded, and the buffer control circuit 42 will switch the incoming information back to the buffer A and start loading it, while the unloading of the buffer B is started simultaneously.

This cycle is repeated continuously as long as information is transferred to the magnetic tape handler apparatus 30. It is seen that this cycle, therefore, determines the tape format. The 128 character quantum block occupies 2.13 milliseconds mutiplied by 60 inches per second to equal 0.128 inch (the distance between markers 14 in FIG. 1), and the succeeding intrequantum gap occupies 0.72 millisecond multiplied by 60 inches per second to equal 0.043 inch (the distance 15 in FIG. 1).

Consider now the case of low input information transfer rate, where the magnetic tape runs in a start-stop mode. Here the storage buffer will be loaded by the incoming information in (128 divided by 300) seconds or 427 milliseconds.

Assume that the storage buffer is being loaded at the time the operation first comes under consideration. After 427 milliseconds, it will be full, and the buffer control circuit 42 will switch the incoming information to buffer B.

Simultaneously, tape motion will be initiated, and a tape positioning operation will start. The positioning operation has a result such that the tape will be moving forward at the proper speed and will be the proper distance past the end of the previously recorded group of quantum blocks when the buffer control circuit 42 causes the buffer A to begin to unload.

The entire unloading process again will take 2.13 milliseconds, and when it is completed, the buffer control circuit 42 will cause the tape to stop.

The tape positioning control consists of a backing-up operation until the markers of the previously written block are sensed; at which time, tape motion is reversed. The markers will be sensed again going forward and will be used to activate a timing device.

The time interval is adjusted so that at its conclusion, the unload command will be generated which will cause the same interquantum gap to be realized as was generated automatically during the high input data transfer rate recording. Using a conventional tape handler apparatus, this entire process takes in the order of 15 milliseconds.

Similarly, the stopping process, after the buffer is unloaded, takes in the order of 3 milliseconds in such a conventional machine.

Consequently, the entire writing process for an individual quantum block takes about 15 plus 2.13 plus 3 milliseconds, or 20 milliseconds total time. This time accumulates while the buffer is being loaded.

When the buffer B is full, the process repeats itself with the places of the buffers A and B interchanged in the description. This cycle is repeated continuously as long as information is transferred into the system of the present invention.

A reading of the tape is accomplished in the opposite manner from that just described. The tape reads the stored information and passes it on to the buffer control circuit 42 which loads it alternately into the buffers A and B.

While one buffer is being loaded, the other buffer is being unloaded, and this information being unloaded is being sent to the output circuit 76. The rate at which unloading occurs is controlled, as was described in previous paragraphs, by an oscillator internal to the buffer control circuit 42. If the output information transfer rate is to be 300 characters per second, the oscillator frequency will be 300 cycles per second, and the magnetic tape will move in the start-stop mode of operation using the backing-up positioning procedure.

If the transfer rate is to be 45,000 characters per second, then the oscillator frequency will be 45,000 cycles per second, and the tape will move continuously. Since either rate produces the same format on the tape by virtue of the recording process, it is possible to record at one rate and reproduce at another rate.

The following claims are intended to define the valid scope of this invention over the prior art.

What is claimed is:

1. An information processing system comprising:
   a tape handler apparatus including an information transfer station,
   means for storing information,
   an information signal input terminal,
   means for coupling information from said input terminal at the rate it is received into said storage means,
   means responsive to a predetermined state of said storage means to couple information stored in said storage means to said information transfer station at a rate higher than said received rate, and
   means for advancing a tape a predetermined distance relative to said station both during intervals when information is coupled to said information transfer station and during intervals when no information is coupled to said transfer station, whereby information is recorded on the tape with a predetermined format irrespective of the rate at which information is received at said input terminal.

2. An information processing system as in claim 1 wherein said advancing means includes means to start and stop said tape.

3. An information processing system as in claim 1 wherein said advancing means includes means responsive to a predetermined state of said storage devices to start and stop said tape.

4. An information processing system as in claim 2 wherein said advancing means further includes means for accelerating a tape to a predetermined speed prior to recording information thereon.

5. An information processing system as in claim 4 wherein said advancing means further includes means to move said tape back prior to advancing said tape.

6. An information processing system comprising:
   a tape handler aparatus including an information transfer station,
   first and second information storage devices,
   an information signal input terminal,
   means responsive to a predetermined state of said storage devices for alternatively coupling information from said input terminal at the rate it is received to one of said storage devices and for coupling information stored in the other of said storage devices to said information transfer station at a rate higher than said received rate, and means for advancing said tape a predetermined distance relative to said station during intervals when information is coupled to said information transfer station and during intervals when no information is coupled to said information station, whereby information is recorded on the tape with a predetermined format irrespective of the rate at which is is received at said input terminal.

7. An information processing system as in claim 6 wherein said advancing means includes means responsive to a predetermined state of said storage devices to start and stop said tape.

8. An information processing system comprising:

a substantially permanent information storage device including means to transfer information into and out of the device, first and second information storage buffer devices, an information storage buffer control circuit including an oscillator circuit to generate a pulse sequence with a predetermined number of selectable different frequencies to determine different rates of information transfer and means responsive to said pulse sequence to develope two output signals with different characteristics, circuit means to receive information-representing pulses and to direct the pulses selectively into the first and second information storage buffer devices in response to the output signals from the buffer control circuit, and connection means to connect information pulses between the first and second storage buffer devices and the substantially permanent information storage device in response to signals from the buffer control circuit.

9. An information processing system comprising:

a tape handler apparatus including an information transfer station and means to develop relative motion between an information-storing tape and the transfer station, first and second information storage buffer devices, an information storage buffer control circuit including a bistable multivibrator-type circuit to provide two output signals with different characteristics, gating circuit means to direct information selectively into the first and second information storage buffer devices in response to the output signals, a pulse generator circuit connected to select between the two output signals provided by the bistable multivibrator-type circuit, a pulse counter circuit means including connection means to initiate a pulse from the pulse generator circuit in response to an input pulse, a frequency control circuit connected to provide different rates of pulses to the pulse counter circuit means, input circuit means to receive information-representing pulses including means to connect information pulses to the first and second storage buffer devices, connection means to connect information pulses between the first and second storage buffer devices and the tape handler apparatus in response to signals from the buffer control circuit, and output circuit means to receive information stored in the first and second storage buffer devices from the tape handler apparatus including connection means to feed information out at a transfer rate different from the input rate.

References Cited by the Examiner

UNITED STATES PATENTS 2,905,930 9/1959 Golden ----------- 340—172.5

ROBERT C. BAILEY, *Primary Examiner.*

G. D. SHAW, *Assistant Examiner.*